May 29, 1962　　　M. M. WHITE ETAL　　　3,036,460
FLUID METER
Filed April 10, 1959　　　　　　　　　2 Sheets-Sheet 1
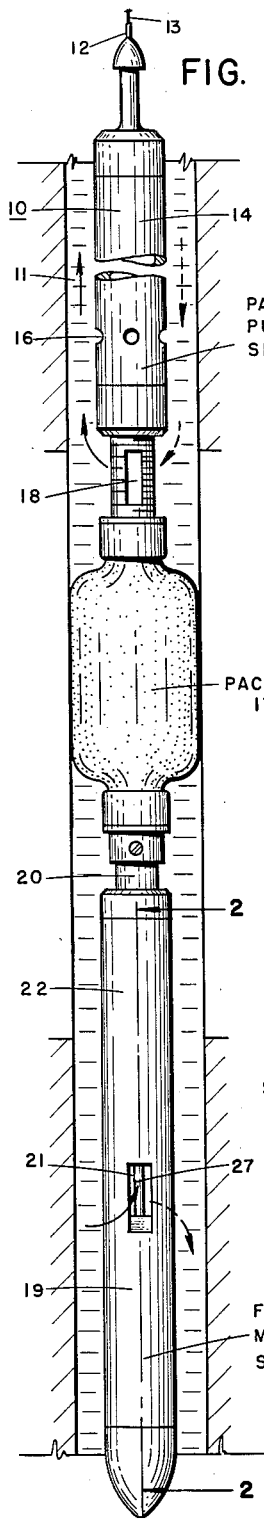
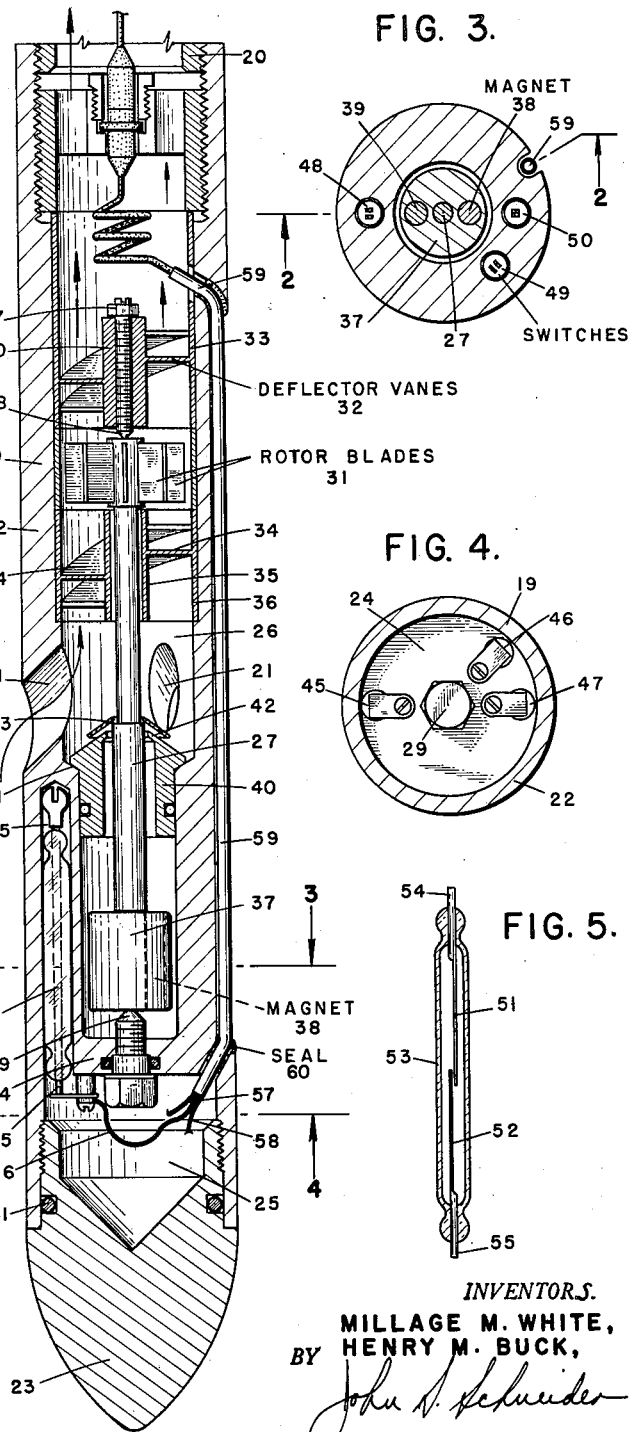
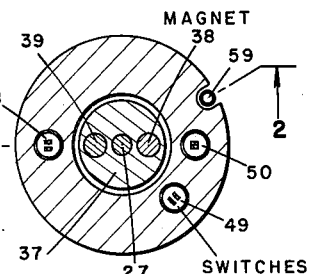
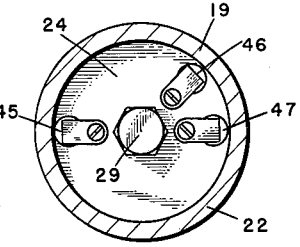
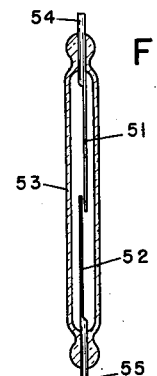
INVENTORS.
MILLAGE M. WHITE,
BY HENRY M. BUCK,
ATTORNEY.

May 29, 1962    M. M. WHITE ETAL    3,036,460
FLUID METER

Filed April 10, 1959    2 Sheets-Sheet 2

*INVENTORS.*
MILLAGE M. WHITE,
BY HENRY M. BUCK,

*John S. Schneider*

ATTORNEY.

United States Patent Office 3,036,460
Patented May 29, 1962

1

3,036,460
FLUID METER
Millage M. White, Tulsa, Okla., and Henry M. Buck, Houston, Tex., assignors, by mesne assignments, to Jersey Production Research Company, Tulsa, Okla., a corporation of Delaware
Filed Apr. 10, 1959, Ser. No. 805,401
1 Claim. (Cl. 73—155)

This invention relates to a fluid meter for measuring the rate and direction of fluid flow.

More particularly, this invention relates to a flowmeter which utilizes magnetically actuated switches for indicating fluid flow and which is especially adaptable for determining the rate and direction of fluid flow in well bores.

The present invention comprises a housing provided with an open chamber and a closed chamber, said housing being provided with openings to permit flow of fluid through said open chamber; fluid flow responsive means arranged in said open chamber in the path of fluid flow therethrough; a magnet connected to said fluid flow responsive means and adapted to rotate in one circumferential direction in response to upwardly directed fluid flow and to rotate in an opposite circumferential direction in response to downwardly directed fluid flow; at least two magnetically actuated switches arranged in said closed chamber and positioned adjacent said magnet, said switches opening and closing in response to rotation of said magnet; and an electrical circuit connected to said switches including means adapted to transmit and register electrical signals or pulses in response to closing and opening of said switches. The direction of fluid flow is established by transmitting and registering a different sequence of signals for the different directions of rotation of the magnet. In one embodiment of the invention three irregularly spaced switches are used to provide the different signal sequences and in another embodiment two irregularly spaced switches are used; in the latter instance the distinguishing characteristic is effected by variation in signal amplitudes.

Thus, a primary object of the invention is to provide an improved flowmeter apparatus for determining the rate and direction of fluid flow in boreholes.

This and other objects of the invention will be apparent from a description of the invention taken in conjunction with the drawings wherein:

FIG. 1 is an elevational view of the device of the invention arranged in a borehole and connected to a preferred type of packer equipment;

FIG. 2 is a vertical view, partly in section, of the device of the invention;

FIG. 3 is a view taken on lines 3—3 of FIG. 2;

FIG. 4 is a view taken on lines 4—4 of FIG. 2;

FIG. 5 is a sectional view of the switch shown in FIG. 2;

Figure 7:
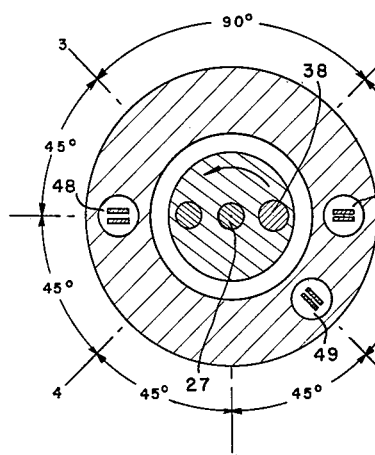
FIG. 7 is a diagrammatic view of the arrangement of the magnet and switches according to the embodiment of the invention shown in FIG. 6 and illustrates one manner of operating the switches.

Referring more particularly to the drawings, in FIG. 1 is shown fluid metering apparatus generally designated 10 suspended in a borehole 11 by means of a cable 12 provided with an insulated inner conductor 13. This apparatus includes a motor section 14, a pump section 15 provided with a pump intake 16, a packer section 17 provided with fluid inlet and outlet ports 18, and a flowmeter section 19 connected to the packer section mandrel 20 and provided with fluid inlet and outlet ports 21 arranged in accordance with the flowmeter shown and described in U.S. patent application Ser. No. 602,047, now U.S. Patent No. 2,856,006, entitled "Combination Subsurface Packer and Flowmeter," filed August 3, 1956, by Rumble et al.

The flowmeter section 19, shown in detail in FIG. 2 comprises a cylindrical housing 22 provided with a nose plug 23 which with a wall member 24 separates housing 22 into a closed chamber 25 and an open chamber 26. The open upper end of housing 22 is threadedly connected to the packer section mandrel 20. Ports 21 are provided intermediate the length of housing 22 to permit flow of well fluids through chamber 26. A rotatable shaft 27 is supported in chamber 26 between upper and lower pivot bearings 28 and 29 which engage upper and lower bearing surfaces provided on shaft 27. Upper pivot bearing 28 is threadedly engaged with an axial sleeve 30. A retaining nut 31 secures bearing 28 in sleeve 30 and permits adjustment of the bearing in a vertical direction. Lower pivot 29 is a bolt which extends through wall member 24 and is threadedly connected thereto.

Vertically and radially extending rotor blades 31 are connected to shaft 27 in any desired manner to rotate shaft 27 in response to the action of fluid flow on impeller blades 31. Upper deflector vanes 32 are arranged between sleeve 30 and an outer sleeve 33. These deflector vanes are positioned above blades 31 and function to direct downward fluid flow against blades 31. Lower deflector vanes 34 are arranged between an inner sleeve 35 surrounding shaft 27 and an outer sleeve 36. These vanes are located below blades 31 and function to direct upward fluid flow against blades 31. The deflectors may be omitted, if desired; or the form of the impeller and deflectors may be modified. For example, blades 31 may be curved instead of straight and the deflectors may comprise fluid flow passageways instead of blades.

As seen in FIGS. 2 and 3, shaft 27 is provided with an enlarged lower portion 37 in which is arranged a cylindrically configured magnet 38 having poles at the opposite ends thereof and a counterbalancing demagnetized cylindrically configured member 39 of equal weight. Magnet 38 and member 39 are positioned on opposite sides of the axis of shaft 27.

A debris guard 40 is mounted below openings 21 and above magnet 38 on a shoulder 41 formed on the interior wall of housing 22. Lip portion 42 of guard 40 extends to adjacent shaft 27 and functions to deflect debris to prevent debris from falling near magnet 38. A second debris guard 43 is positioned about shaft 27 just above the debris guard 40.

Chamber 25 includes a plurality of recesses 45, 46, and 47 (see FIG. 4). Magnetically actuated switches 48, 49, and 50 are arranged in recesses 45, 46, and 47, respectively (see FIG. 3). As seen in FIG. 5, the magnetically operated switch includes reed members 51 and 52 hermetically sealed in a dry atmosphere in envelope 53. The reeds shown and described herein are normally open and magnetically actuated to closed positions. However, the reeds may be magnetically biased to normally closed positions and magnetically actuated to open positions or vice-versa. Reeds 51 and 52 are connected to conductors 54 and 55, respectively. Conductors 54 are grounded by connection to housing 22 and conductors 55 connect each reed 52 in switches 48, 49, and 50 to leads 56, 57, and 58, respectively. These leads connect with conductor 13. A conduit 59 extending upwardly from chamber 25 and extending through chamber 26 provides a protective covering for the electrical leads. Conduit 59 is sealed to housing 22 as at 60 to exclude well fluids from chamber 25; also, an O-ring seal 61 is provided on nose plug 23 for this same purpose.

Figures 6, 10:
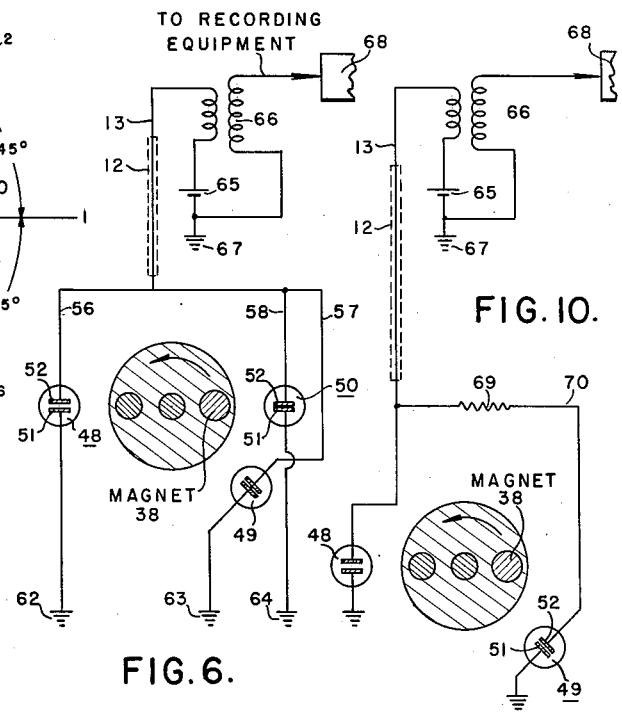
FIG. 6 is a diagrammatic view of the indicator portion of the meter of one embodiment of the invention.
FIG. 10 is a diagrammatic view of the indicator portion of the meter of another embodiment of the invention.

In the three-magnetic switch system illustrated in FIG. 6, upon rotation of shaft 27 and magnet 38, magnetism is induced into switches 48, 49, and 50 as magnet 38 passes adjacent these switches. FIG. 7 illustrates an arrangement wherein magnet 38 closes each of the magnetic switches through an angle of approximately 90° rotation. A different spacing of the switches or a different size magnet which will allow the switches to be opened or closed more or less than 90° may be used. However, in the arrangement shown, each switch closes as magnet 38 comes within 45° of it and remains closed until magnet 38 passes to a point 45° beyond. As seen in FIG. 6, reeds 51 of switches 48, 49, and 50 are grounded as at 62, 63, and 64, respectively. Reeds 52 are electrically connected to a source of electrical energy 65 and a transformer 66 grounded as at 67 by means of leads 56, 57, and 58 and conductor 13. Transformer 66 is connected to electronic pulse indicator equipment 68 which may be suitably any desired type of electrical signal registering or recording means as, for example, an oscilloscope, aural monitor, etc.

Figure 8:
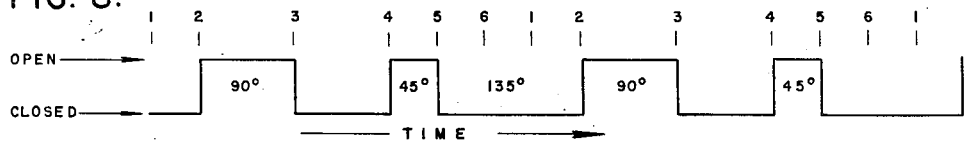
FIG. 8 illustrates a recording of the electrical signals generated employing the embodiment of the invention shown in FIGS. 6 and 7 when fluid flow rotates the magnet in a counterclockwise direction.
Figure 9:
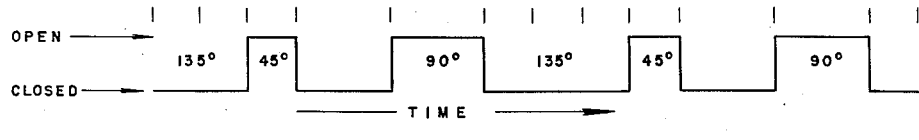
FIG. 9 is a recording similar to that shown in FIG. 8 except the magnet rotates in a clockwise direction in this case.

Referring to FIGS. 7, 8, and 9, assuming shaft 27 is rotating counterclockwise, as indicated by the arrow in FIG. 7, in position (1) of magnet 38, switch 48 is open, switch 49 is about to open and switch 50 is closed. As shaft 27 rotates from magnet position (1) to magnet posion (2), switch 48 is open, switch 49 is open, and switch 50 is closed. As magnet 38 moves from position (2) to position (3), all three switches are open. When magnet 38 passes position (3), switch 48 closes and remains closed until position (4) is reached by magnet 38. When magnet 38 is positioned between position (4) and position (5), all switches are open. As position (5) is reached, switch 49 closes and remains closed until magnet 38 moves just past position (1). When magnet 38 is positioned between positions (6) and (1), both switches 49 and 50 are closed. As seen in FIG. 8, when the recorder shows the 45° open signal (4 to 5) immediately preceding the 135° closed signal (5 to 2), shaft 25 is rotating counterclockwise. However, as seen in FIG. 9, when shaft 25 rotates clockwise, the 135° closed signal (2 to 5) precedes the 45° open signal (5 to 4).

Figure 11:
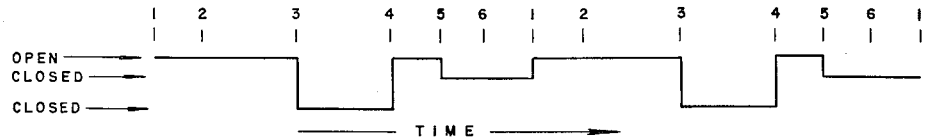
FIG. 11 is a recording of the electrical signals generated employing the embodiment of the invention shown in FIG. 10 when fluid flow rotates the magnet in a counterclockwise direction.

A similar arrangement is shown in FIG. 10; however, herein only two switches 48 and 49 are employed. In this embodiment a resistance 69 is connected into lead 70 interconnecting switch reed 52 of switch 49 and conductor 13. A recording illustrative of the arrangement of FIG. 10 is shown in FIG. 11. When magnet 38 is located between positions (1) and (3), both switches 48 and 49 are open. Between positions (3) and (4), switch 48 is closed which causes a signal of full amplitude to be recorded. When magnet 38 is located between positions (4) and (5), both switches 48 and 49 are open. Between positions (5) and (1) of magnet 38, switch 49 is closed and in this position a signal is recorded which is lesser in amplitude than the signal recorded when switch 48 is closed. FIG. 11 illustrates counterclockwise operation. For clockwise operations, the sequence of lesser and greater signal amplitudes will be reversed similar to the sequence reversal of FIG. 9 relative to the sequence of FIG. 8.

Operation of the pump for inflating and deflating the packer is fully described in the Rumble et al patent application, noted supra. Also described in this patent application is an electrical circuit arrangement whereby the pump and packer and the flowmeter are sequentially operated. That is, the flowmeter is disconnected from the circuit when the pump is inflating or deflating the packer and the pump motor is disconnected from the circuit when the flowmeter is registering electrical signals.

When it is desired to determine rate and direction of fluid flow in a borehole, the packer in deflated condition is lowered in the borehole 11 by means of cable 12 to a desired depth. Motor section 14 then is energized to operate the pump section 15 to inflate the packer. When the packer has been inflated an amount sufficient to seal off the borehole, well fluid is directed to flow through the meter. The fluid flow direction may be upwardly or downwardly. For example, in the case of upward flow, fluid enters flowmeter 19 through ports 21 and exits the instrument through ports 18. At this time the pump motor is disconnected from the circuit and the flowmeter connected thereto in order to measure the rate and direction of fluid flow in the borehole.

The fluid flowing through housing 22 impinges upon impeller blades 31 to rotate shaft 27 in one direction which, in turn, rotates the enlarged portion 37 of shaft 27 containing magnet 38. Rotation of magnet 38 causes switches 48, 49, and 50 to open and close, as described supra.

Although the two embodiments shown herein utilize two and three magnetic switches, respectively, the invention is not to be considered limited thereto for more than three switches may be employed if it is so desired.

Having fully described the nature, objects, and elements of the invention, we claim:

A flow meter for detecting rate and direction of fluid flow in a well bore comprising: a housing;
  means separating said housing into an open upper chamber and a closed lower chamber, said housing being provided with an open upper end and openings intermittent the length thereof for permitting well fluids to flow through said upper chamber;
  a rotatable shaft arranged in said upper and lower chambers;
  fluid flow responsive means arranged on said shaft in said upper chamber, fluid flowing in one direction rotating said fluid flow responsive means in one circumferential direction and fluid flowing in an opposite direction rotating said fluid flow responsive means in an opposite circumferential direction;
  a magnet arranged in said lower chamber on the lower end of said shaft below the openings in said housing;
  debris guard means arranged in said upper chamber and forming a closure for said lower chamber adapted to prevent debris from falling to adjacent said magnet;
  two magnetic switches spaced circumferentially different distances from each other in clockwise and counter-clockwise directions and spaced radially from said shaft equal distances, said magnetic switches being positioned about and adjacent said magnet and isolated from said chambers;
  an electrical circuit connected to said magnetic switches including means for transmitting and registering electrical signals generated in response to operation of said switches; and means included in said electrical circuit for modifying said signals to provide signals of lesser magnitude resulting from the closing of one of said switches such that said electrical signals registered during directionally opposite rotations of said shaft are distinguishable whereby said registered electrical signals indicate the rate and direction of fluid flow through said upper chamber.

References Cited in the file of this patent

UNITED STATES PATENTS

| | | |
|---|---|---|
| 2,334,920 | Gosline et al. | Nov. 23, 1943 |
| 2,346,864 | Packard | Apr. 18, 1944 |
| 2,607,221 | Babson et al. | Aug. 19, 1952 |
| 2,649,712 | Dale | Aug. 25, 1953 |
| 2,934,947 | Buck | May 3, 1960 |
| 2,962,895 | Rumble | Dec. 6, 1960 |